3,330,670
FOOD PACKAGE AND METHOD OF FORMING SAME

Paul E. Grindrod and Forrest D. Hamm, Madison, Wis., assignors to Oscar Mayer & Company, Inc., Chicago, Ill., a corporation of Illinois
No Drawing. Filed Dec. 28, 1964, Ser. No. 421,719
6 Claims. (Cl. 99—171)

This application is a continuation-in-part of our copending application entitled "Method of Forming Packages," Ser. No. 312,147, filed Sept. 27, 1963, now Patent No. 3,228,168.

The present invention relates to improvements and innovations in packages for the storing and merchandising of perishable commodities such as, for example, meat products. More specifically, this invention relates to a reclosable package equipped with an improved pressure-sensitive adhesive.

As used in the specification and claims, the term "polyvinylidene chloride" is intended to include this particular film material as well as other film materials having substantially the same physical properties as polyvinylidene chloride enabling such other film materials to be used as a substitute therefor in the practice of the present invention. In particular, the physical properties referred to include the ability to attain a supercooled or essentially amorphous state wherein the film exhibits substantial formability enabling it to be readily drawn over a product in an intimate contour-forming relation therewith without the formation of any folded, pleated or overlapping film areas. In the above-mentioned copending application we disclose a method of forming a hermetically sealed package from film materials, such as polyvinylidene chloride (e.g. Saran) or equivalent thereof, which exhibit unique formability and sealing characteristics. An adhesive interface is employed in these packages to seal together the film and substrate portions of the package.

It is an object of the present invention to provide a hermetically sealed package employing an improved pressure-sensitive adhesive which can be subjected to a wide variation in temperature while still maintaining hermetic sealing conditions.

Another object of the present invention is to provide an improved package employing a pressure-sensitive adhesive which permits the package to be readily opened for access to the product enclosed thereby, and which permits the package to be reclosable to an extent that the product will be protected by the package.

A further object of the present invention is to provide a novel pressure-sensitive adhesive composition particularly suitable for establishing hermetic sealing between a polyvinylidene chloride, or equivalent, film and substrate surface.

A further object of the present invention is to provide an adhesive composition which is "wetted" by a supercooled polyvinylidene chloride film to an extent that a greatly improved seal between said film and a substrate surface results.

Other and further objects of the present invention will be apparent from the following detailed explanation of a preferred embodiment thereof.

Packages formed from polyvinylidene chloride, or equivalent, film and the adhesive of the present invention find significant utility in the packaging of cheese and processed meats such as sliced bologna, weiners, and the like. It should be appreciated, however, that they are readily adapted for use with other types of products where the presence of their advantageous properties are considered desirable.

In accordance with the present invention, the pressure-sensitive adhesive composition includes three basic constituents, namely, a film former, a tackifier, and a plasticizer. Each of these constituents can be composed of one or more individual components depending upon the specific properties of the particular ingredients used and the desired characteristics of the adhesive composition. In this connection, it should be noted that many of the individual components while primarily serving in one capacity, will function secondarily in another.

For example, in a preferred embodiment of the adhesive composition two tackifiers are employed which also exhibit some film-forming characteristics. Similarly, in another embodiment, one of the tackifiers also functions as a secondary plasticizer.

The tackifier constituent of the adhesive composition includes, as a principal component thereof, a natural rosin-derived alkyd-type resin. In this connection, it has been found that wood rosin can be treated to obtain alkyd-type resins which can be advantageously used as tackifiers. For example, one such product results from the treatment of natural rosin with maleic acid. In accordance with this invention, concentrations of this natural copolymer resinous tackifier range from 50 to 70 percent by weight of the overall adhesive composition. "Neolyn 20" is an example of a commercially available resin derived from natural rosins which is particularly suitable for use in connection with the packaging of meat products since it is nontoxic and both water and fat insoluble. In addition to its function as a tackifier, "Neolyn 20" also serves as a secondary film former. As used in this application, the term "natural rosin-derived alkyd-type resin" is intended to cover other resinous materials exhibiting similar tackifier and film forming properties to those of "Neolyn 20."

Another component of the tackifier constituent of the adhesive composition of the present invention is the phthalate ester of hydroabietyl alcohol. This ingredient commercially available under the trademark "Cellolyn 21" has a preferred concentration range of from 5 to 15 percent, by weight of the overall adhesive composition. Also, as was true of the natural rosin-derived alkyd-type resin described above, "Cellolyn 21" also exhibits the advantageous characteristics of being both water and fat insoluble, thereby making it particuluarly suitable for use in the packaging of meat products.

In some adhesive formulations prepared in accordance with the present invention, it has been found desirable to include a third tackifier, namely, hydroabietyl alcohol. This component in addition to primarily functioning as a tackifier also acts as a secondary plasticizer. The preferred concentration range for this ingredient is from 0 to 10 percent, by weight, of the overall adhesive composition.

The film-forming constituent desirably includes ethylene-vinyl acetate resins which, in addition to acting as film formers, also serve to lend flexibility to the otherwise brittle natural rosin-derived alkyd-type resins used in the tackifier constituent. In this connection, "Neolyn 20," being extremely brittle at freezer temperatures (around 0° F.), is made flexible by the addition of the ethylene-vinyl acetate resins.

In a preferred embodiment of the adhesive composition, two film formers are included. One is a high viscosity, high molecular weight ethylene-vinyl acetate copolymer such as that marketed under the trademark "Comer DQDQ 3269." The second film former is a low molecular weight, graft-type ethylene-vinyl acetate copolymer, such as that current marketed under the trademark "A/C 400." This latter ingredient in addition to functioning as a film former and lending flexibility to the "Neolyn 20" also functions to reduce the viscosity of the hot melt, thereby improving the mechanical application of the adhesive. Preferred ranges for each of these film former components are from 5 to 7.5 percent, by weight, of the overall adhesive composition.

The pressure-sensitive property of the adhesive composition results from the addition of a plasticizer to the above listed components. A single plasticizer such as diethyl phthalate or hydroabietyl alcohol may be employed in this capacity in an overall concentration range of from 5 to 20 percent, by weight. Other plasticizer components exhibiting characteristics and properties similar to diethyl phthalate and hydroabietyl alcohol may, of course, be substituted in place of, or used in combination with these components.

Two specific formulations exhibiting advantageous properties which included lack of brittleness under low temperature storage conditions (around 0° F.), good resistance to ultraviolet light deterioration, ease of mechanical application at elevated temperatures (around 275° F.) and excellent hermetic sealing with ready separation of film at temperatures of from 25° F. to room temperature, had the following specific composition:

|  | Parts by Weight | |
|---|---|---|
|  | Comp. "A" | Comp. "B" |
| Neolyn 20 | 60.5 | 50.0 |
| Cellolyn 21 | 12.2 | 25.0 |
| A/C 400 | 6.1 | 5.0 |
| Comar DQDA 3269 | 6.1 | 5.0 |
| Diethyl Phthalate | 15.1 | 10.0 |
| Hydroabietyl Alcohol |  | 5.0 |
|  | 100.0 | 100.0 |

The ingredients listed above can be combined in a number of manners. One technique which can be used involves heating the "Neolyn 20," and "Cellolyn 21" to around 300° F., followed by slowly adding the "A/C 400," "Comer DQDQ 3269" and hydroabietyl alcohol with continuous stirring. The plasticizer (diethyl phthalate) is then blended to complete the mixture. After adding the plasticizer it is advisable to continue stirring for 10 or 15 minutes afterward to insure thorough blending.

The pressure-sensitive adhesive described above can, in accordance with an important concept of the present invention, be used to form a unique hermetic seal between a supercooled polyvinlidene chloride film or equivalent thereof, and another packaging film. The seal, being formed along an interface can be readily broken by peeling back or otherwise separating one or more of the films or plies sealed together through the interface. Breaking of the seal is readily obtained without destruction of the packaging film and this film in the area of seal breakage can be recombined for resealing of the package following removal of a portion of the product therefrom. Basically, the seal comprises and is formed from at least two layers of packaging material adhered to one another through an adhesive interface, one of the film layers being polyvinylidene chloride film or equivalent thereof which, while in an amorphous or supercooled state, is adhered to the other layer of packaging material through the interface. The polyvinylidene chloride film in the finished condition of the package exhibits at least substantially random crystal arrangement.

In this connection, it is important to note that supercooled polyvinylidene chloride film is uniquely formable in its supercooled state to an extent that a film layer can be readily drawn down over a product into intimate contour-conforming relation therewith without the formation of any folded, pleated or overlapping film areas. The unusual formability of the supercooled film, when used with adhesive formulations prepared in accordance with the present invention, results in the film coming into intimate contact with the adhesive surface to an extent that a greatly improved seal is obtained when comparison of this seal is made with known types of packaging material adhesive seals. Significantly, the formation of the supercooled film is so complete and formability is so unusual that film tension in the seal area is absent to an extent that subsequent warping of the package is prevented. Wrinkling of the supercooled film or the formation of folds or pleats is completely eliminated and the seal formed is capable of withstanding normal package handling without the development of leakage areas.

A number of package constructions which can be constructed in accordance with the present invention are described in detail in the copending application, Ser. No. 312,147, referred to above. As is shown therein, certain of these package constructions include a relatively rigid base member on which the product is centrally located. Each of the packages illustrated therein is primarily adapted for use in the packaging of food products, particularly processed meats. In such packages, the adhesive formulation of the present invention is subjected to extreme temperature variations. For example, during the application of the adhesive to the package, temperatures of around 250° F. to 325° F. are common. On the other hand, as soon as the packages are formed, they are generally stored in freezer compartments wherein the temperature drops to around 0° F. It has been found that the adhesive compositions of the present invention are effective over this extreme temperature range. For example, they maintain the proper viscosity and resist becoming stringy at the elevated temperatures of the hot melt application step. Similarly, when the temperature of the applied adhesive is reduced to the very low temperatures mentioned above, the adhesive and seal formed therewith maintain their flexibility, thereby effectively resisting the formation of cracks and the like which can act to destroy the hermetic sealing condition. In addition to these advantageous properties at extreme temperatures, it has been found that adhesive compositions of the present invention also permit ready separation of the adhered film at temperatures from 25° F. to 85° F. and above.

The adhesive composition is particularly desirable for use in securing a supercooled polyvinylidene chloride film to a vinyl film. It similarly has been employed in forming hermetic seals between opposed sheets of Mylar. In this connection, it should be noted that the use of this adhesive in combination with supercooled polyvinylidene chloride film is unusual in that the hermetic seal obtained with the supercooled film as compared to the crystalline film is significantly better in the case of the supercooled film. This unusual property is further evidenced by the fact that the adhesive works markedly better in adhering vinyl to supercooled polyvinylidene chloride film than it does in adhering a vinyl film to another vinyl film.

One means for applying the adhesive composition to a package web is described in detail in the copending application, Ser. No. 408,842, filed Nov. 4, 1964, entitled "Method and Apparatus for Continuously Forming Packages" and, assigned to the same assignee as the present application. As shown therein, the adhesive is stored in tanks which are preferably maintained at a sufficient temperature which will keep the adhesive from becoming too viscous so as to permit its ready transference to a transfer roller. Applying rollers pick up the adhesive from the transfer rollers and transmit it directly to the peripheral portions of the package-forming web. A product is then placed on the package-forming web and an amorphous supercooled polyvinylidene chloride film is placed in overlying relation therewith. This upper film is fully and intimately collapsed over the exposed surfaces of the product in tight conforming relation therewith by a package-forming evacuation technique whereby a vacuum is formed within the package to draw the film into tight adherence with the product and with the base member of the package. Such film smoothly acquires a configuration of the product and rim and tightly and intimately adheres thereto.

Certain other modifications and variations of the invention as hereinbefore set forth may also be made without departing from the spirit and scope thereof. Accordingly, only such limitations should be imposed as are indicated in the appended claims.

We claim:

1. A package comprising a product enclosed by a packaging material defining a seal adjacent to said product and through which access can be gained to said product, said seal being formed from at least two layers of packaging material adhered to one another through a pressure-sensitive adhesive interface, one of said layers being a polyvinylidene chloride film adhered to the other layer of packaging material through said interface while said polyvinylidene chloride film is in an amorphous state and which exhibits at least substantially random crystal arrangement in the crystalline state, said adhesive comprising from 50% to 70% by weight of a natural rosin-derived alkyd-type resin, from 10% to 15% by weight of ethylene-vinyl acetate resin, and from 5% to 20% by weight of plasticizer, whereby said pressure sensitive adhesive is readily peelable along said pressure-sensitive adhesive interface without destruction of said packaging material enabling said layers of packaging material to be recombined for resealing following removal of a portion of the product from said package.

2. The package of claim 1 wherein said pressure-sensitive adhesive also includes from 5% to 15% by weight of the phthalate ester of hydroabietyl alcohol.

3. A package enclosing a meat product, said package comprising a relatively rigid base material in which said product is centrally located, a thin coating of said insoluble pressure-sensitive adhesive on the top surface of said base material extending continuously around the periphery of said product, said adhesive comprising from 50% to 70% by weight of a natural rosin-derived alkyd-type resin, from 10% to 15% by weight of ethylene-vinyl acetate resin and from 5% to 20% by weight of plasticizer, a flexible polyvinylidene chloride film drawn over the top of said product and downwardly along the sides thereof in continuous sealing adherence with said adhesive on said base, said polyvinylidene chloride film having been drawn over said product while in an amorphous supercooled state and exhibiting substantially random crystal arrangement throughout, said pressure sensitive adhesive being readily peelable enabling separation of said polyvinylidene chloride film from said base material without destruction to said film or base material and resealing of said film on said base material following removal of a portion of the product from said package.

4. The package of claim 3 wherein said pressure sensitive adhesive also includes from 5% to 15% by weight of the phthalate ester of hydroabietyl alcohol.

5. The method of forming a hermetic package comprising the steps of applying a continuous coating of a pressure-sensitive adhesive to a package substrate material peripherally of a product receiving area of said package substrate material, said adhesive comprising from 50% to 70% by weight of a natural rosin-derived alkyd-type resin, from 10% to 15% by weight of ethylene-vinyl acetate resin and from 5% to 20% by weight of a plasticizer, placing the product on said product receiving area, enclosing said product with an amorphous supercooled polyvinylidene chloride film in overlying relation with said substrate material and contacting said film continuously with said adhesive about said product while said film is in its amorphous supercooled state, whereby a pressure sensitive adhesive interface is formed between said polyvinylidene chloride film and package substrate material which pressure-sensitive adhesive interface can be readily broken without destruction to said film or package substrate material and can be selectively recombined for resealing of said hermetic package.

6. The method of claim 5 wherein said pressure-sensitive adhesive also includes from 5% to 15% by weight of the phthalate ester of hydroabietyl alcohol.

References Cited

UNITED STATES PATENTS

| | | | |
|---|---|---|---|
| 2,130,740 | 9/1930 | Humphrey. | |
| 2,679,969 | 1/1954 | Richter. | |
| 2,697,084 | 12/1954 | Eger | 260—27 |
| 2,803,611 | 8/1957 | Lamm | 260—27 |
| 3,051,670 | 8/1962 | Grantham | 260—27 X |
| 3,083,106 | 3/1963 | Sloan et al. | 99—171 |
| 3,131,069 | 4/1964 | Goller et al. | 99—174 |
| 3,137,580 | 6/1964 | Sloan et al. | 99—171 |
| 3,220,966 | 11/1965 | Flanagan | 260—27 |
| 3,232,895 | 2/1966 | Klein et al. | 260—27 |

OTHER REFERENCES

Zimmerman, "Handbook of Material Trade Names" 1953, published by Industrial Research Service, Dover, New Hampshire, p. 388, article entitled Neolyns.

A. LOUIS MONACELL, *Primary Examiner.*

HYMAN LORD, *Examiner.*